UNITED STATES PATENT OFFICE.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

BROWN DYE.

SPECIFICATION forming part of Letters Patent No. 509,635, dated November 28, 1893.

Application filed May 3, 1893. Serial No. 472,826. (Specimens.) Patented in England August 26, 1890, No. 13,443, and in France December 9, 1890, No. 210,033.

*To all whom it may concern:*

Be it known that we, MORITZ ULRICH and JOHANN BAMMANN, chemists, doctors of philosophy, and assignors to the FARBENFABRIKEN, VORMALS FR. BAYER & CO., of Elberfeld, subjects of the Emperor of Germany, residing at Elberfeld, Prussia, Germany, have invented a new and useful Improvement in the Manufacture of Coloring-Matter, (for which the aforesaid FARBENFABRIKEN has already obtained Letters Patent in France, No. 210,033, dated December 9, 1890, and in England, No. 13,443, dated August 26, 1890,) of which we give in the following a clear and exact description.

Our invention relates to the manufacture of a brown substantive or direct-dyeing coloring-matter, which can be diazotized, when fixed on the fiber, and which results from the action of one molecular proportion of tetrazodiphenylsalt upon one molecular proportion of the amidonaphthol disulphoacid $NH_2:SO_3H:SO_3H:OH = 1:3:6:8$) or an alkaline salt thereof and one molecular proportion of the so called Bismarck-brown, which product is described by Caro and Griess, (*Zeitschrift fur Chemie*, Neue Folge, 1867 III, 278,) and results from the action of nitrous acid on meta phenylene diamine.

In carrying out our invention practically we proceed as follows: 2.9 kilos, by weight, of benzidine are converted in the well known manner by means of ten kilos, by weight, of hydrochloric acid (20° Baumé) and 2.2 kilos, by weight, of sodium nitrite into the tetrazo-compound. Then 5.7 kilos, by weight, of the sodium salt of the above named amidonaphtholdisulfoacid dissolved in fifteen liters of water is poured into the tetrazo solution. On adding an excess of sodium acetate to the mixture the intermediate product separates as a gelatinous precipitate. After standing for some time a solution in water of five kilos, by weight, of Bismarck-brown is added and then the reaction mixture is neutralized by means of nine kilos, by weight, of sodium carbonate ($Na_2CO_3$). After some hours the formation of the dye-stuff is completed by raising slowly the temperature at about 100° centigrade. The coloring-matter is separated by salting out with common salt, filtering off, pressing and drying. It has the formula: (in which we have briefly signified the coupled Bismarck-brown as B)

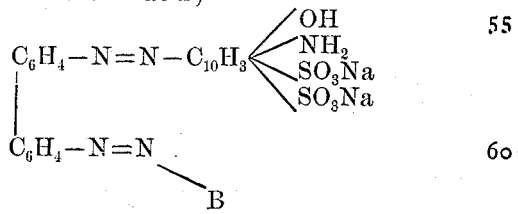

and forms a dark-brown powder, soluble in cold water with difficulty, easily soluble in hot water with a violet-brown color, insoluble in concentrated soda-lye. On the addition of hydrochloric-acid to the watery solution of the dye-stuff a brown precipitate is formed. Concentrated sulfuric acid (66° Baumé) dissolves the dye-stuff with a violet-black color, while on the addition of ice-water to this sulfuric acid solution dark flakes are precipitated.

The coloring-matter produces on unmordanted cotton brown shades. When fixed on the fiber the dye-stuff can be diazotized and directly be coupled with any dye-stuff component (as for instance beta-naphthol), shades fast to washing and soaping being obtained in this manner.

Having thus described our invention, what we claim, and desire to secure by Letters Patent, is—

1. The process for the production of a new brown coloring-matter by the action of one molecular proportion of the tetrazo compound of benzidine on one molecular proportion of amidonaphtholdisulfo acid and one molecular proportion of the so-called Bismarck brown.

2. The coloring-matter having the following formula (in which B signifies the coupled Bismarck-brown)

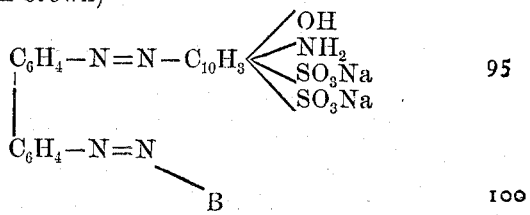

which coloring-matter forms a dark brown powder easily soluble in hot water with a violet-brown color, dark flakes being separated on the addition of hydrochloric acid to the latter, soluble in concentrated sulfuric (66° Baumé) acid with a violet-black color, a dark precipitate being formed on the addition of ice water to the sulfuric acid solution and having the qualities substantially as described.

In testimony whereof we have signed our names in the presence of two subscribing witnesses.

MORITZ ULRICH.
JOHANN BAMMANN.

Witnesses:
WM. ESSENWEIN,
RUDOLPH FRICKE.